United States Patent
Tang

(10) Patent No.: US 12,142,778 B2
(45) Date of Patent: Nov. 12, 2024

(54) ULTRASONIC BATTERY-MOUNTING DEVICE

(71) Applicant: Lahui Tang, Guangdong (CN)

(72) Inventor: Lahui Tang, Guangdong (CN)

( * ) Notice: Subject to any disclaimer, the term of this patent is extended or adjusted under 35 U.S.C. 154(b) by 594 days.

(21) Appl. No.: 17/502,028

(22) Filed: Oct. 14, 2021

(65) Prior Publication Data

US 2022/0190424 A1    Jun. 16, 2022

(30) Foreign Application Priority Data

Dec. 12, 2020    (CN) .......................... 202011453559.1

(51) Int. Cl.

| | |
|---|---|
| *H01M 50/24* | (2021.01) |
| *H01M 10/625* | (2014.01) |
| *H01M 10/6552* | (2014.01) |
| *H01M 10/6567* | (2014.01) |
| *H01M 50/242* | (2021.01) |
| *H01M 50/249* | (2021.01) |
| *H01M 50/244* | (2021.01) |

(52) U.S. Cl.
CPC .......... *H01M 50/24* (2021.01); *H01M 10/625* (2015.04); *H01M 10/6552* (2015.04); *H01M 10/6567* (2015.04); *H01M 50/242* (2021.01); *H01M 50/249* (2021.01); *H01M 50/244* (2021.01); *H01M 2220/20* (2013.01); *Y02E 60/10* (2013.01)

(58) Field of Classification Search
CPC ........... H01M 10/625; H01M 10/6552; H01M 10/6563; H01M 10/6567; H01M 2220/20; H01M 50/24; H01M 50/242; H01M 50/244; H01M 50/249; Y02E 60/10
See application file for complete search history.

(56) References Cited

U.S. PATENT DOCUMENTS

2010/0156350 A1 *   6/2010  Murayama .......... H01M 50/242
                                                              320/128

* cited by examiner

*Primary Examiner* — Lingwen R Zeng

(57) ABSTRACT

An ultrasonic battery-mounting device, having a battery holder, a base, shock-absorbing parts, an ultrasonic vibrating motor installed at a bottom surface of the battery holder to achieve high frequency ultrasonic vibration of the battery holder, and a battery fixture part provided on the battery holder. The battery holder is provided on the base, and the shock-absorbing parts are installed between the battery holder and the base to reduce vibrational transfer from the battery holder to the base. The ultrasonic vibrating motor produces ultrasonic vibration in high frequency, causing battery fluid or particles in the battery to move in high frequency to reduce the problems of internal crystallization and blockage due the formed crystals, or poor flow of electrons due to low external temperature, thereby maintaining the battery in a well-functioning condition without changing the internal structure of the battery.

10 Claims, 2 Drawing Sheets

ULTRASONIC BATTERY-MOUNTING DEVICE

BACKGROUND OF THE INVENTION

The present invention relates to storage batteries and more particularly pertains to a battery-mounting device for a storage battery.

As electrified vehicles becoming more and more widely used, there is an increasing usage of storage batteries for vehicles. Currently, lead acid battery and lithium battery are of the highest usage for electrified vehicles.

For lead acid battery, after being used for a period of time, lead sulfate crystals will attach to the surface of the electrode plate. The increasing amount of this kind of crystals will constitute an obstacle to the contact between the electrode plate and the electrolyte, thus affects the storage performance and charge-discharge performance of the lead acid battery.

For lithium battery, it is mainly composed of a positive electrode (LiMn2O4 materials), a negative electrode (graphite materials), electrolyte and a separator. When a power supply is charging the battery, electrons on the positive electrode move to the negative electrode through an external circuit; lithium ions enter the electrolyte, move through the curvy holes on the separator and swim to the negative electrode, combining with the electrons arrived earlier at the negative electrode. When the battery is discharging, electrons on the negative electrode move to the positive electrode through the external circuit; lithium ions enter the electrolyte, move through the curvy holes on the separator and swim to the positive electrode, combining with the electrons arrived earlier at the positive electrode. Lithium ions depart from the positive electrode and arrive at the negative electrode after passing through the electrolyte. After the battery charges and discharges for the first time, a passivation layer of solid electrolyte, namely solid electrolyte interface (SEI), will be formed between electrodes and the liquid electrolyte. SEI has a dual role of being an insulator of electrons and a good conductor of lithium ions. This layer protects the battery by preventing harmful reactions from occurring and allows lithium ions to travel between electrodes and the electrolyte. SEI is the key element for the performance of lithium battery. If the performance of SEI is unsatisfactory, many problems will be found. When SEI is decaying, loads of problems will arise, such as deposition inhomogeneity on the lithium electrodes, resulting in crystal formation, after multiple times of charging and discharging. These lithium metal crystals will constitute an obstacle to the movement of lithium ions, leading to a loss of battery capacity, lower charge-discharge efficiency, or, due to continuous crystal formation, the crystals may pierce through the separator, causing short circuit of the electrodes and eventually spark a fire.

The working temperature for lithium battery is 0-40° C. When the ambient temperature is lower than 0° C., the pores (so-called "tiny holes) on the separator will shrink due to thermal contraction, making it more difficult or even impossible for lithium ions to pass through the separator. Lithium ions will also be easily frozen in the electrolyte and their movement becomes slower, which makes the lithium battery unable to charge and discharge as usual, undermining the overall performance of the lithium battery. When the ambient temperature is too high, or when the battery is charged or discharged rapidly, the internal temperature of the battery is likely to rise and cause spontaneous combustion.

Therefore, this is a technical issue that needs to be resolved, on how to overcome the aforesaid existing problems of lead acid battery and lithium battery in order to improve their performance and applicability in this era of electrified vehicles.

BRIEF SUMMARY OF THE INVENTION

In view of the aforesaid disadvantages now present in the prior art, the present invention provides an ultrasonic battery-mounting device, in which a battery holder, a base, shock-absorbing parts, an ultrasonic vibrating motor, a battery fixture part, etc., form a battery-mounting structure. In practice, the battery is fixed in position on the battery holder by the battery fixture part. The ultrasonic vibrating motor produces ultrasonic vibration in high frequency, causing battery fluid or particles in the battery to move in high frequency to reduce the problems of internal crystallization and blockage due to the formed crystals, or poor flow of electrons due to low external temperature, thereby maintaining the battery in a well-functioning condition without changing the internal structure of the battery. It is easy, convenient to use, and produces little vibrational transfer and noises.

To attain this, the present invention adopts the following technical solutions:

An ultrasonic battery-mounting device, comprising a battery holder, a base, shock-absorbing parts, an ultrasonic vibrating motor and a battery fixture part. The ultrasonic vibrating motor is installed at a bottom surface of the battery holder to achieve high frequency ultrasonic vibration of the battery holder; the battery fixture part is provided on the battery holder, the battery holder is provided on the base, and the shock-absorbing parts are installed between the battery holder and the base to reduce vibrational transfer from the battery holder to the base.

Furthermore, the present invention comprises a heat radiation pipe, a radiator, a radiator fan and a recessed placement cavity provided on the battery holder. The heat radiation pipe is placed on a wall surface of the recessed placement cavity. One end of the heat radiation pipe is connected with an input end provided on the radiator through a first pipeline, and an output end provided on the radiator is connected with another end of heat radiation pipe through a second pipeline and a third pipeline. The radiator fan is installed on the radiator.

Furthermore, the present invention also comprises a liquid storage tank and an electric liquid pump. Said another end of the heat radiation pipe is connected with an output end of liquid storage tank through the third pipeline. The electric liquid pump is also connected in series with the heat radiation pipe and the liquid storage tank in the third pipeline between the heat radiation pipe and the liquid storage tank. An input end of the liquid storage tank is connected with the output end of the radiator through the second pipeline.

Furthermore, two sides of a bottom surface of the battery holder are provided with outward tilting surfaces respectively; two sides of a top surface of the base are provided with inward tilting surfaces respectively; the inward tilting surfaces correspond to the outward tilting surfaces respectively. An upper and a lower end of each of the shock-absorbing parts are connected with a respective outward tilting surface and a corresponding inward tilting surface respectively, so that the shock-absorbing parts tilt towards a central position of the battery holder.

The benefits of this invention are as follows:

The present invention uses a battery-mounting structure formed by a battery holder, a base, shock-absorbing parts, an ultrasonic vibrating motor, a battery fixture part, etc. In practice, the battery is fixed in position on the battery holder by the battery fixture part. The ultrasonic vibrating motor produces ultrasonic vibration in high frequency, causing battery fluid or particles in the battery to move in high frequency to reduce the problems of internal crystallization and blockage due the formed crystals, or poor flow of electrons due to low external temperature, thereby maintaining the battery in a well-functioning condition without changing the internal structure of the battery. It is easy, convenient to use, and produces little vibrational transfer and noises.

DETAILED DESCRIPTION OF THE INVENTION

Figure 1:
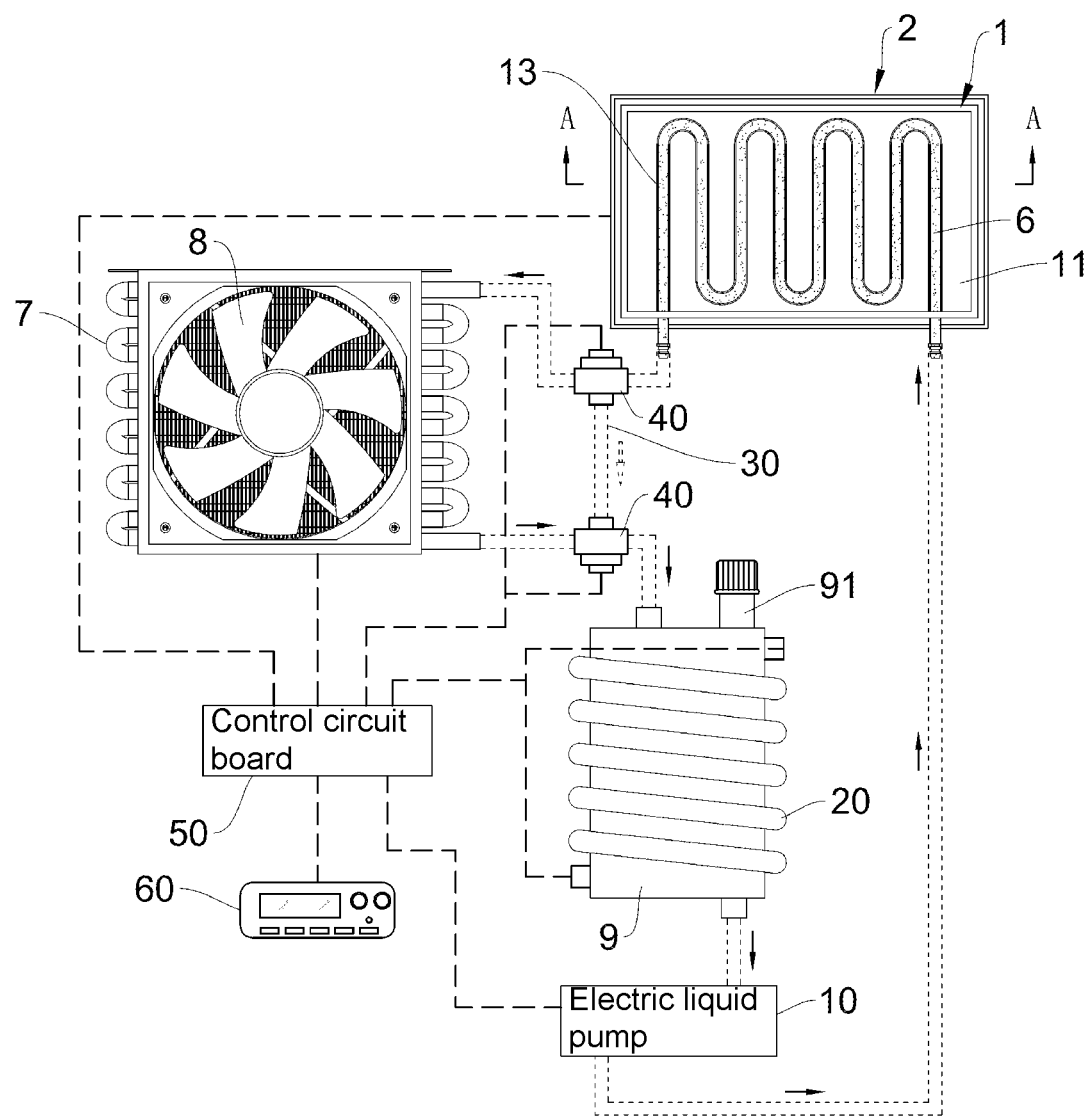
FIG. 1 shows the schematic structural view of this invention.
Figure 2:
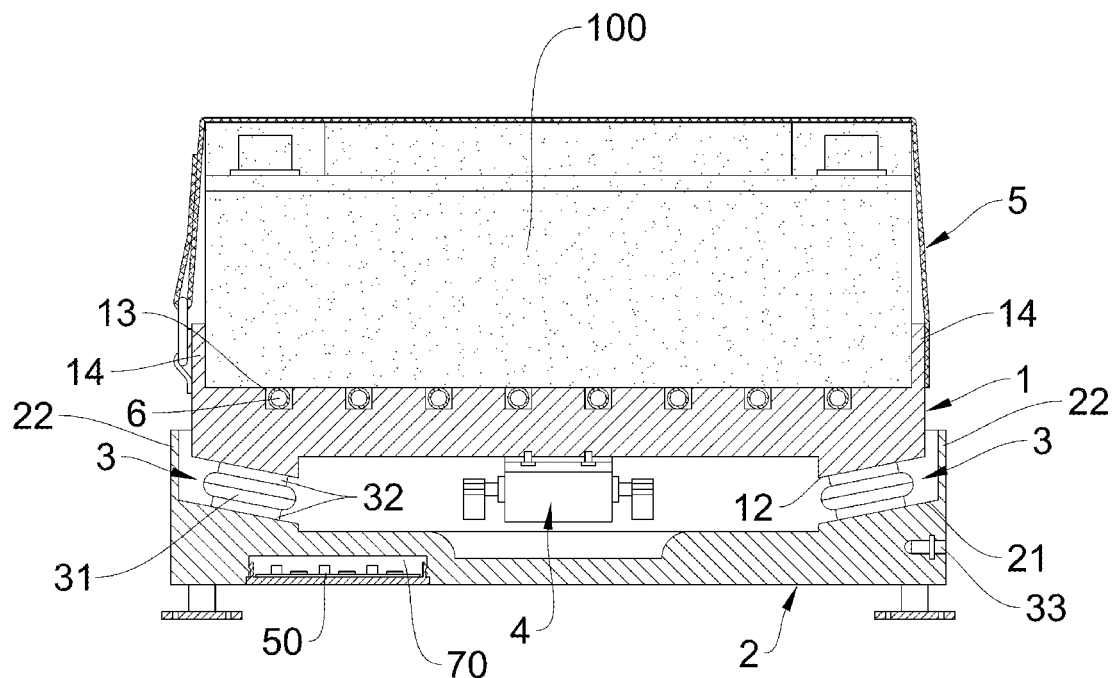
FIG. 2 shows the schematic cross-sectional view of the first embodiment along A-A direction of FIG. 1.
Figure 3:
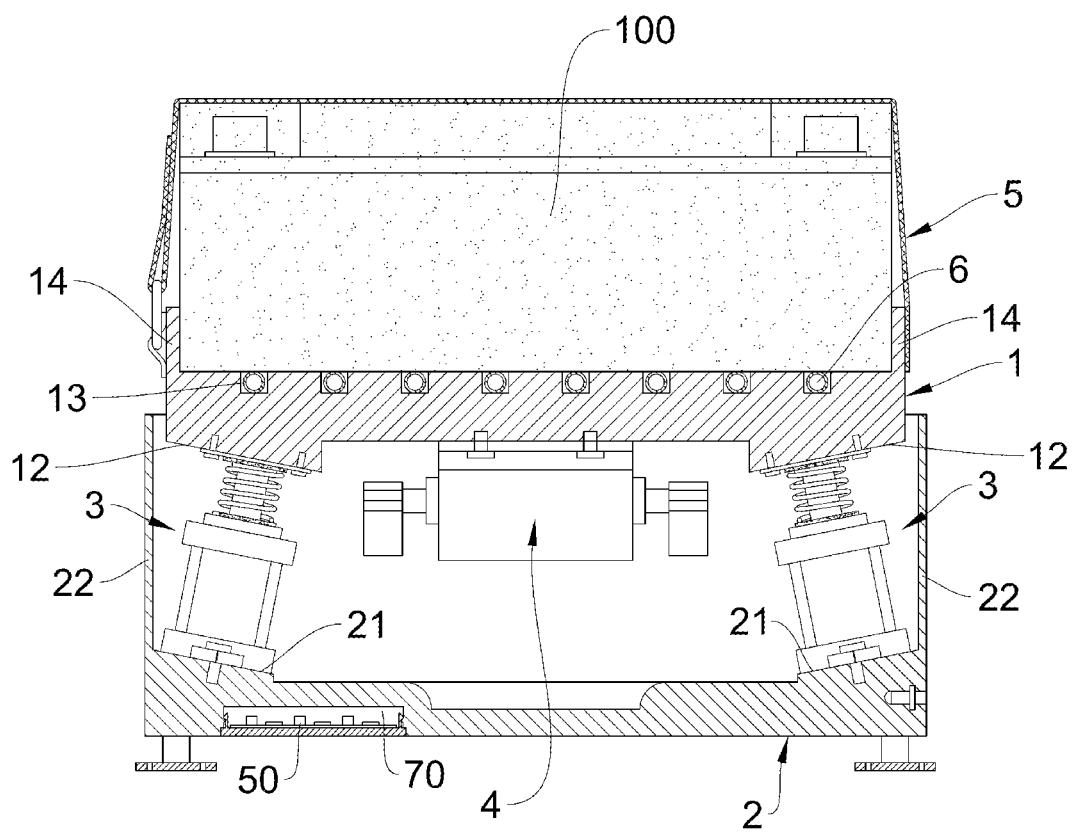
FIG. 3 shows the schematic cross-sectional view of the second embodiment along A-A direction of FIG. 1.

As illustrated in FIGS. 1 to 3, an ultrasonic battery-mounting device described in this invention comprises a battery holder 1, a base 2, shock-absorbing parts 3, an ultrasonic vibrating motor 4 and a battery fixture part 5. The ultrasonic vibrating motor 4 is installed at a bottom surface of the battery holder 1 to achieve high frequency ultrasonic vibration of the battery holder 1; the battery fixture part 5 is provided on the battery holder 1, the battery holder 1 is provided on the base 2, and the shock-absorbing parts 3 are installed between the battery holder 1 and the base 2 to reduce vibrational transfer from the battery holder 1 to the base 2. In practice, as illustrated by FIG. 2 or 3, a storage battery 100 is placed on the battery holder 1 and is fixed in position by the battery fixture part 5, to avoid vibrating noises due to insecure mounting of the storage battery 100 on the battery holder 1. When the ultrasonic vibrating motor 4 is operating, the ultrasonic vibrating motor produces ultrasonic vibration in high frequency, causing battery fluid or particles in the battery to move in high frequency to reduce the problems of internal crystallization and blockage due the formed crystals, or poor flow of electrons due to low external temperature, thereby maintaining the battery in a well-functioning condition.

To make this invention feature-rich by providing battery cooling and battery flame-retarding functions, as illustrated in FIGS. 1 to 3, this invention also comprises a heat radiation pipe 6 bent in multiple rows, a radiator 7, a radiator fan 8 and a recessed placement cavity 11 provided on the battery holder 1. The heat radiation pipe 6 is placed on a wall surface of the recessed placement cavity 11. One end of the heat radiation pipe 6 is connected with an input end provided on the radiator 7 through a first pipeline, and an output end provided on the radiator 7 is connected with another end of heat radiation pipe 6 through a second pipeline and a third pipeline. The radiator fan 8 is installed on the radiator 7. Due to the above configurations, when the storage battery is placed on the battery holder 1, coolant filled in the heat radiation pipe 6 can take away the heat so that the battery has a faster cooling speed when charging or discharging rapidly or in high ambient temperature, thereby preventing spontaneous combustion of the battery.

Furthermore, to speed up the movement of the coolant in the heat radiation pipe 6 and increase the efficiency of cooling, as illustrated by FIG. 1, this invention further comprises a liquid storage tank 9 and an electric liquid pump 10. Said another end of the heat radiation pipe 6 is connected with an output end of liquid storage tank 9 through the third pipeline. The electric liquid pump 10 is also connected in series with the heat radiation pipe 6 and the liquid storage tank 9 in the third pipeline between the heat radiation pipe 6 and the liquid storage tank 9. An input end of the storage tank 9 is connected with the output end of the radiator 7 through the second pipeline. The liquid storage tank 9 and the electric liquid pump 10 facilitate the movement of the coolant in the heat radiation pipe 6, speed up heat exchange and hence cool down the battery more rapidly.

On the basis of the aforesaid cooling function, there is also a function to raise the temperature of the storage battery in low ambient temperature, so that the storage battery is maintained in a well-functioning condition in any circumstances. As illustrated in FIG. 1, an electric heating component 20 is wound on a surface of the liquid storage tank 9. In this function mode, there is no need to cool down the coolant and heat loss has to be reduced. To achieve this, as illustrated in FIG. 1, a first branch 30 is provided to connect the input end and the output end of the radiator 7 in parallel; both ends of the first branch 30 are connected with electromagnetic on-off switching valves 40 respectively. The electromagnetic on-off switching valves 40 can be used to stop the coolant from flowing through the radiator 7 and cause the coolant to flow back into the liquid storage tank 9 for heating, shorten the flowing distance of the coolant and hence increase the efficiency of heat exchange. When the cooling function is in use, the electromagnetic on-off switching valves 40 block the first branch 30 so that the coolant can flow through the radiator 7. To make it more convenient for users to refill coolants, as illustrated by FIG. 1, a refilling opening 91 with a cap is provided on the liquid storage tank 9.

To reduce the loss of energy to the surroundings, as illustrated by FIG. 2 or 3, the recessed placement cavity 11 is surrounded by side wall plates 14. To conceal the gap between the battery holder 1 and the base 2 and to reduce the chance of dust or external objects entering in between the battery holder 1 and the base through the gap, as illustrated by FIG. 2 or 3, the base 2 can also be surrounded by side blocking plates 22.

For an uniform management and control of the aforesaid electric components, as illustrated by FIG. 1, this invention further comprises a control circuit board 50; the ultrasonic vibrating motor 4, the electric liquid pump 10, the electric heating component 20 and the electromagnetic on-off switching valves 40 are electrically connected with the control circuit board 50 respectively. There is also an operation panel module 60 electrically connected with the control circuit board 50 for users to operate this invention conveniently. During actual implementation, the control circuit board 50 can be provided with an IC main control chip and WIFI module or Bluetooth® module, so that the invention can be controlled by a developed APP program. Infrared module can also be added for remote control by using a remote controller.

To optimize the shock-absorbing structure of this invention and its performance, as illustrated by FIG. 2 or 3, two sides of the bottom surface of the battery holder 1 are provided with outward tilting surfaces 12 respectively; two sides of a top surface of the base 2 are provided with inward tilting surfaces 21 respectively; the inward tilting surfaces 21 correspond to the outward tilting surfaces 12 respectively. An upper and a lower end of each of the shock-absorbing parts 3 are connected with a respective outward tilting surface 12 and a corresponding inward tilting surface 21 respectively, so that the shock-absorbing parts 3 tilt towards a central position of the battery holder 1. Such a configuration of the shock-absorbing parts 3 tilting towards the central position of the battery holder 1 correspond to the angles of the circumferential vibration produced when the ultrasonic vibrating motor is operating, so that the circumferential vibration generated by the ultrasonic vibrating motor will not be translated to a swing torsion upon the shock-absorbing parts. Instead, the circumferential vibration will create a downward pressing force along the tilting angles of the shock-absorbing parts 3. This acts as shock absorbance and protection to the shock-absorbing parts 3 as the downward pressing force matches with the up down motions of the shock-absorbing parts 3; therefore, the shock-absorbing parts 3 will not be affected by circumferential torsion. Rubber fatigue, metal fatigue and rupture will be largely eliminated and hence ensuring a longer lifetime for the shock-absorbing parts 3.

The shock-absorbing parts 3 illustrated in this invention can be soft rubber shock-absorbing struts, spring struts, shock-absorbing airbags (as illustrated by FIG. 2) or hydraulic cylinders (as illustrated by FIG. 3). Each shock-absorbing airbag comprises a rubber air bag 31 and metal capping connectors 32 provided on an upper and a lower end of the rubber air bag 31. The metal capping connectors 32 are also provided with gas pipelines which are connected with piping interfaces on the metal-capping connectors 32. An inflation port 33 connecting with the gas pipelines is provided on the base 2. The inflation port 33 can be connected with an inflating apparatus to refill gas for the shock-absorbing airbags or to control the gas pressure thereof.

To place the heat radiation pipe 6 in the recessed placement cavity 11 easily and reasonably, and to create a larger contact area between the storage battery and the heat radiation pipe, as illustrated by FIG. 1 to FIG. 3, the wall surface of the recessed placement cavity 11 is provided with a slot 13 configured in multiple S shapes. The heat radiation pipe 6 is mounted in the slot 13 following the S shapes of the slot. As illustrated by FIG. 2 or 3, a bottom surface of the base 2 is provided with an electric cabinet 70 with the control circuit board 50 installed therein. This is to make better use of space and to optimize the overall layout structure.

The above content presents the preferred embodiments of the present invention but does not limit the protection scope thereof. Changes and improvements made by a person skilled in this field of art in accordance with the scope of teachings of the present invention without deviating from the inventive concept of the present invention should also fall within the scope of protection of the present invention.

What is claimed is:

1. An ultrasonic battery-mounting device, comprising:
   a battery holder (1);
   a base (2);
   shock-absorbing parts (3);
   an ultrasonic vibrating motor (4);
   a battery fixture parts (5);
   the ultrasonic vibrating motor (4) is installed at a bottom surface of the battery holder (1) to achieve high frequency ultrasonic vibration of the battery holder (1); the battery fixture part (5) is provided on the battery holder (1); the battery holder (1) is provided on the base (2), and the shock-absorbing parts (3) are installed between the battery holder (1) and the base (2) to reduce vibrational transfer from the battery holder (1) to the base (2).

2. The ultrasonic battery-mounting device as in claim 1, further comprising:
   a heat radiation pipe (6);
   a radiator (7);
   a radiator fan (8);
   a recessed placement cavity (11) provided on the battery holder (1);
   the heat radiation pipe (6) is placed on a wall surface of the recessed placement cavity (11); one end of the heat radiation pipe (6) is connected with an input end provided on the radiator (7) through a first pipeline, and an output end provided on the radiator (7) is connected with another end of heat radiation pipe (6) through a second pipeline and a third pipeline; the radiator fan (8) is installed on the radiator (7).

3. The ultrasonic battery-mounting device as in claim 2, further comprising:
   a liquid storage tank (9);
   an electric liquid pump (10);
   said another end of the heat radiation pipe (6) is connected with an output end of liquid storage tank (9) through the third pipeline; the electric liquid pump (10) is also connected in series with the heat radiation pipe (6) and the liquid storage tank (9) in the third pipeline between the heat radiation pipe (6) and the liquid storage tank (9); an input end of the liquid storage tank (9) is connected with the output end of the radiator (7) through the second pipeline.

4. The ultrasonic battery-mounting device as in claim 3, characterized in that:
   an electric heating component (20) is wound on a surface of the liquid storage tank (9);
   a first branch (30) is provided to connect the input end and the output end of the radiator (7) in parallel;
   both ends of the first branch (30) are connected with electromagnetic on-off switching valves (40) respectively.

5. The ultrasonic battery-mounting device as in claim 4, further comprising:
   a control circuit board (50);
   the ultrasonic vibrating motor (4); the electric liquid pump (10); the electric heating component (20) and the electromagnetic on-off switching valves (40) are electrically connected with the control circuit board (50) respectively.

6. The ultrasonic battery-mounting device as in claim 5, further comprising an operation panel module (60) electrically connected with the control circuit board (50).

7. The ultrasonic battery-mounting device as in claim 1, characterized in that:
   two sides of the bottom surface of the battery holder (1) are provided with outward tilting surfaces (12) respectively; two sides of a top surface of the base (2) are provided with inward tilting surfaces (21) respectively; the inward tilting surfaces (21) correspond to the outward tilting surfaces (12) respectively; an upper and a lower end of each of the shock-absorbing parts (3) are connected with a respective outward tilting surface (12) and a corresponding inward tilting surface (21) respectively, so that the shock-absorbing parts (3) tilt towards a central position of the battery holder (1).

8. The ultrasonic battery-mounting device as in claim 7, characterized in that:
   the shock-absorbing parts (3) are soft rubber shock-absorbing struts, spring struts, shock-absorbing airbags or hydraulic cylinders.

9. The ultrasonic battery-mounting device as in claim 2, characterized in that:
   a wall surface of the recessed placement cavity (11) is provided with a slot (13) configured in multiple S shapes; the heat radiation pipe (6) is mounted in the slot (13) following the S shapes of the slot (13).

10. The ultrasonic battery-mounting device as in claim 5, characterized in that:
   a bottom surface of the base (2) is provided with an electric cabinet (70) with the control circuit board (50) installed therein.

* * * * *